Dec. 2, 1969　　　G. Q. BOGNER　　　3,481,015
ROTARY CUTTING TOOL
Filed July 19, 1967　　　2 Sheets-Sheet 1

INVENTOR
GERALD Q. BOGNER
BY Baldwin, Doran & Egan
ATTORNEYS

Dec. 2, 1969  G. Q. BOGNER  3,481,015
ROTARY CUTTING TOOL
Filed July 19, 1967  2 Sheets-Sheet 2
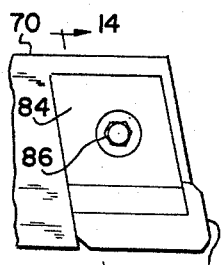
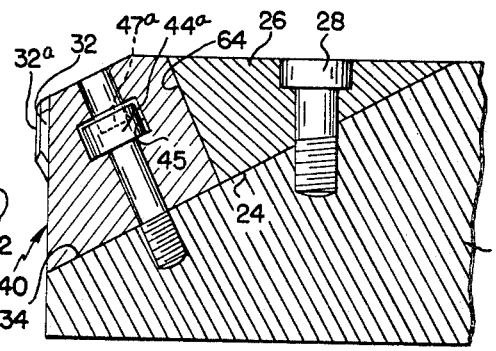
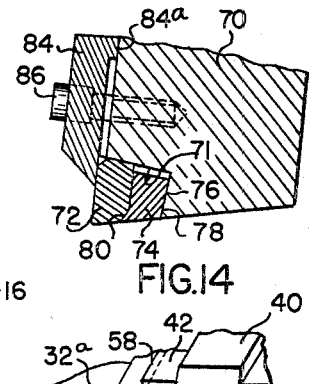
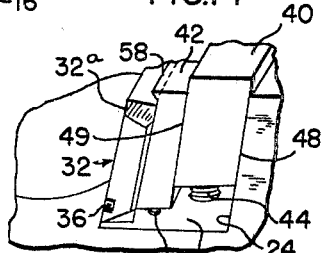
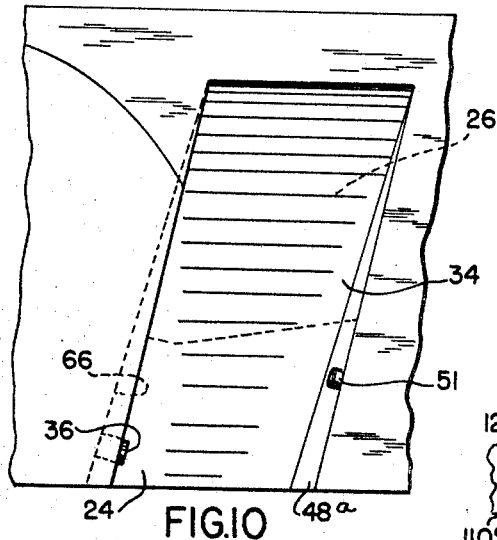
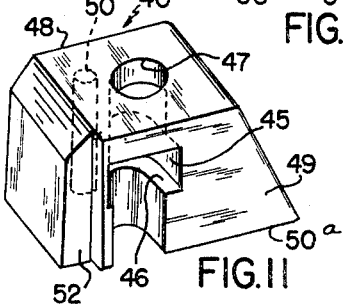
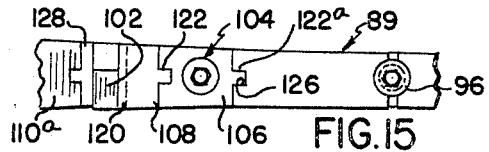
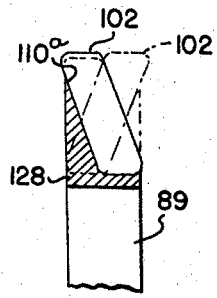
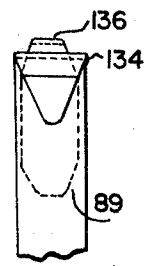
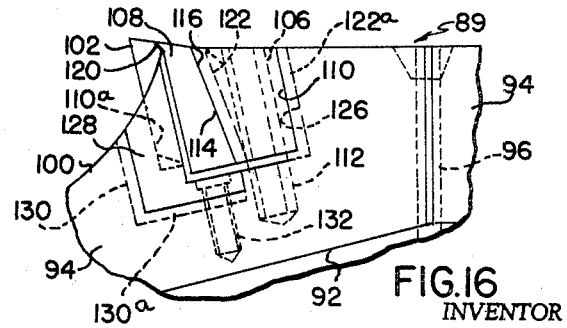
INVENTOR
GERALD Q. BOGNER
BY Baldwin, Dorant Egon
ATTORNEYS

United States Patent Office

3,481,015
Patented Dec. 2, 1969

3,481,015
ROTARY CUTTING TOOL
Gerald Q. Bogner, 27122 Lake Road,
Bay Village, Ohio 44140
Filed July 19, 1967, Ser. No. 654,466
Int. Cl. B26d 1/12
U.S. Cl. 29—105                                  11 Claims

ABSTRACT OF THE DISCLOSURE

A rotary cutting tool, such as a milling cutter, rotary saw, or the like, for aluminum billets, comprising a rotary body having a plurality of cutting insert or cutting tooth mounting members secured to the body. Each of the mounting members comprises a pocket with a throw-away type cutting insert mounted in the pocket for metal cutting operations. The cutting insert is preferably of the muli-cutting edge, indexible type, whereby when one cutting edge becomes dull through use, the cutting insert may be rotated for exposing a fresh cutting edge, and when all the cutting edges are worn, the cutting insert may be disposed of and replaced by a new or reground insert. A clamping assembly is provided in the pocket coacting with the insert, for holding the insert in predetermined cutting position, with the clamping assembly including a main wedge block and an auxiliary wedge block, coacting with one another in interlocking holding relation, and with the auxiliary wedge block having a lip thereon overlapping a portion of the cutting insert, to prevent the cutting insert from inadvertently being thrown out from the cutting tool during rotation of the latter. Moreover, projecting pins are provided in the pocket of the mounting box, extending into overlapping relationship with respectively the cutting insert and with the main wedge block, to prevent movement of the cutting insert and the main wedge block in a generally axial direction with respect to the rotary body of the cutting tool. The main wedge block is positively held in place by a removable threaded fastener member coacting therewith and with the associated mounting member of the cutting tool. Such an arrangement provides for positive retention of the cutting inserts and proper positioning of the latter in cutting position, during high speed rotation of the cutting tool, without danger that the inserts and associated clamping assembly parts may become loose or break-up and fly off to injure the machine operator. The arrangement also provides for expeditious and rapid indexing and/or replacement of the cutting inserts.

---

This invention relates in general to rotary cutting tools, such as milling cutters, rotary saws and the like, and more particularly to a novel clamping assembly arrangement for positively holding indexible and throw-away type cutting inserts in assembled cutting position on the tool.

In U.S. Patent 3,023,486 issued Mar. 6, 1962 to Gerald Bogner there is illustrated a milling machine of the general type with which the present invention may be expeditiously utilized. The manufacture, use an maintenance of rotary cutting tools such as the aforeidentified milling cutter, are comparatively expensive, and involve many problems, including the necessity to accurately position the cutting inserts or teeth, and the necessity of maintaining the cutting inserts in proper operating condition by keeping the cutting edges thereof properly ground to effectively accomplish the desired cutting operation. The time and cost involved in replacing the cutting inserts and/or sharpening them in prior art arrangements is generally quite high, and the arrangements for holding the cutting inserts in cutting position are either generally quite complex due to the relatively high speeds at which such cutting tools are often operated, or are such that they weaken the cutting inserts resulting sometimes in fragmentation of the latter during operation of the machine. Such operational speeds of the machine may include velocities of 1900 feet or more per minute to accomplish the cutting operation.

The present invention provides a rotary cutting tool utilizing multi-cutting edge, indexible type cutting inserts together with a novel clamping assembly for holding such cutting inserts in cutting position, and wherein such clamping assembly may be readily loosened for indexing a new cutting edge of the respective cutting insert when one cutting edge becomes dull, and also embodying novel means for positively holding the cutting inserts in assembled relation with the cutting tool, without the necessity of drilling holes or the like through the cutting inserts, and which prevent the inserts from being inadvertently thrown off from the tool during high speed operation thereof.

Accordingly, an object of the invention is to provide a novel rotary cutting tool having replaceable cutting inserts.

Another object of the invention is to provide a novel rotary cutting tool utilizing replaceable cutting inserts, and including a novel clamping assembly for positively holding the cutting inserts in assembled relationship with the rotary tool to prevent inadvertent movement of the inserts with respect to the tool during high speed operation thereof, while providing for ready loosening of the clamping assembly, and indexing of the inserts, to present a new cutting edge when one cutting edge thereof becomes dull.

A still further object of the invention is to provide a novel rotary cutting tool which includes a rotary body portion having a plurality of cutting insert mounting members or holders secured thereto, with the cutting inserts being of the indexible multi-edge type, and wherein the clamping assembly comprises a main wedge block and an auxiliary wedge block coacting with one another in holding relationship and with the cutting insert, to hold the insert in proper cutting position on the cutting tool, and with there being provided means for positively preventing radial and axial movement of the cutting insert and the elements of the clamping assembly with respect to the cutting tool in the tightened condition of the clamping assembly, and wherein the clamping assembly may be readily loosened to provide for expeditious indexing of the cutting insert to present a new cutting edge when one operative edge becomes dull through use.

Other objects and advantages of the invention will be apparent from the following description taken in conjunction with the accompanying drawings wherein:

FIGURE 9 is a fragmentary, sectional illustration showing the filler block utilized with the clamping assembly, for filling the slot in the mounting member forming the pocket therein;

FIGURE 10 is an enlarged side elevational view of the obliquely sloped slot, forming the cutting insert receiving pocket in one of the mounting members, and illustrating the pins extending into the pocket for holding coaction with respectively the cutting insert and the main wedge member, for positively preventing movement of the latter out of assembled relationship with the mounting member;

Figure 1:
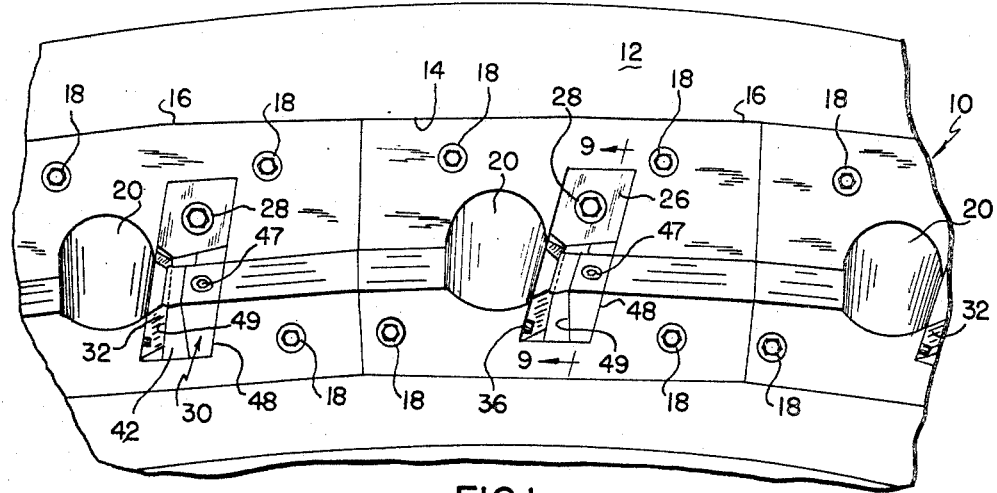
FIGURE 1 is a fragmentary perspective view of the cutting tool showing a plurality of the cutting insert mounting members secured to the periphery of the rotary body of the tool.
Figure 2:
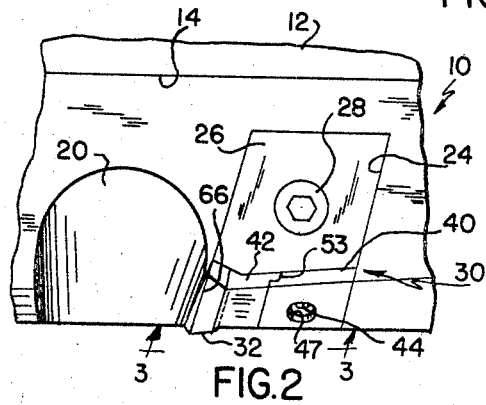
FIGURE 2 is an enlarged, fragmentary generally side elevational view of one of the cutting insert mounting members and illustrating the interlocking relationship between the main and auxiliary wedge blocks of the clamping assembly, and the lip on the auxiliary wedge block overlapping the cutting insert as disposed in the pocket of the mounting member.

FIGURE 11 is a perspective illustration of the main wedge block of the clamping assembly, and illustrating in particular the recess therein for receiving the headed fastener, which holds the main wedge block in assembled relationship with the respective mounting member, and which is operative to move the main wedge block out of wedging coaction upon turning of the fastener in a predetermined direction;

FIGURE 12 is a reduced size, generally diagrammatic view illustrating the clamping assembly in deactivated or loosened condition for enabling ready indexing or replacement of the cutting insert;

FIGURE 13 is a fragmentary side elevational view of a modified form of clamping arrangement and one illustrating a single point cutting insert lathe tool utilizing a lug clamp for holding the cutting insert of the tool in position on the lathe tool;

FIGURE 14 is a sectional view taken generally along the plane of line 14—14 of FIGURE 13;

FIGURE 15 is a fragmentary top plan view of a rotary saw utilizing another embodiment of clamping assembly, for holding a cutting insert in position on the periphery of the saw;

FIGURE 16 is a fragmentary side elevational view of the FIGURE 15 saw;

FIGURE 17 is a fragmentary end elevational diagrammatic view showing the alternated angled positions of the cutting teeth on the saw; and FIGURE 18 is a fragmentary end elevational diagrammatic view similar to FIGURE 17 but showing a different embodiment of saw teeth utilizing a triangular-shaped chip breaker tooth on the saw in conjunciton with a radial cutting tooth and which are alternated with one another along the periphery of the saw.

Referring now again to the drawings, there is illustrated a milling cutter 10 comprising a relatively large, circular body portion 12, adapted for rotation in a milling machine. The body portion may have a recess 14 formed in its periphery for receiving therein a plurality of juxtaposed mounting members or boxes 16 which are held in assembled relationship with the body 12 as by means of bolts or threaded fasteners 18 extending through the respective mounting member into holding coaction with the body portion 12.

Each of the mounting members 16 may be of polygonal-shaped, generally solid construction, having a chip clearance recess 20 formed on the exterior thereof in the conventional manner, and with such recess being disposed adjacent a slot or pocket 24 formed in the respective mounting member. The pocket 24 is preferably milled or formed out of the respective mounting member has an oblique cut through the box for ease of manufacture, and as best shown in FIGURES 9 and 10, and a filler block 26 is utilized to fill the upper portion of the cut through the mounting box. Block 26 may be held in position as by means of a headed threaded fastener 28.

Figure 3:
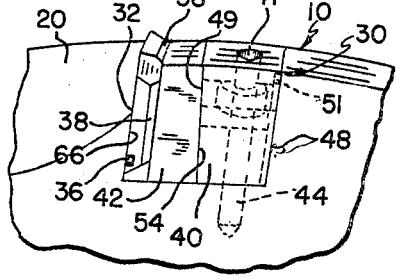
FIGURE 3 is a bottom plan view of the FIGURE 2 assembly taken generally along the plane of line 3—3 of FIGURE 2 looking in the direction of the arrows.
Figures 5, 6:
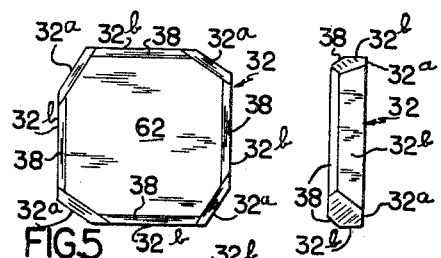
FIGURES 5, 6 and 7 are respectively rear, end and front views of one of the indexible multi-edge cutting inserts adapted for use in the cutting tool.
Figure 7:
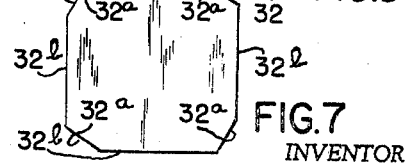

Also disposed in the pocket 24 outwardly of filler block 26 is a clamping assembly designated generally by reference number 30, and a multi-edge indexible cutting insert member 32. Insert 32 in the embodiment illustrated has a plurality of cutting edges 32a and generally flat end surfaces 32b. Insert 32 may be made from a hard material, such as tungsten carbide or other carbides. When in cutting position in the pocket 24 of the mounting member, one of the surfaces 32b thereof engages the bottom surface 34 (FIGURE 9) of the pocket 24 inwardly of pin 36, which extends laterally into the pocket generally adjacent bottom wall 34 (FIGURES 3 and 10) and with one of the cutting edges 32a projecting or being disposed outwardly to provide for the metal cutting operation. It will be understood that as one of the cutting edges becomes worn through use, the insert may be rotated or indexed to present a new, sharp cutting edge, thereby maintaining the cutting efficiency of the tool. Adjacent each of the generally flat end surfaces 32b of the insert, there is provided an oblique or sloping surface 38 (FIGURES 5 and 6) which is disposed at an angle of approximately 45° with respect to the horizontal, and is for a purpose to be hereinafter set forth.

Figures 4, 8:
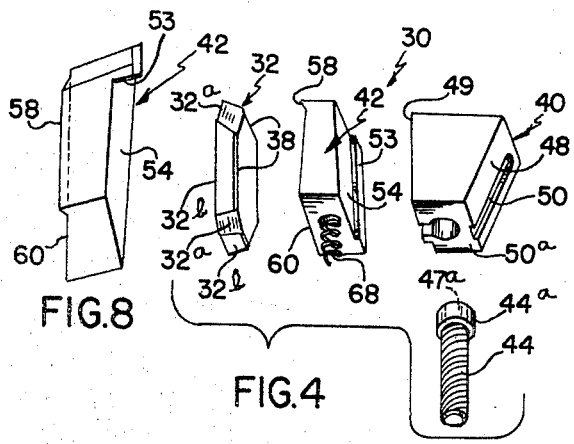
FIGURE 4 is an exploded perspective view of one of the indexible multi-edge cutting inserts together with the auxiliary and the main wedge blocks and associated fastener, of the clamping means, for holding the cutting insert in the pocket of the mounting member of the tool.
FIGURE 8 is an enlarged top plan view of the auxiliary wedge block of the clamping assembly.

The clamping assembly 30 comprises a main wedge member 40 and an auxiliary wedge member 42 which coact in wedging relation to hold insert 32 in proper position. A threaded fastener means 44 (FIGURE 4) is provided for holding the main wedge member 40 in predetermined position in the pocket 24, with said threaded member 44 having a head portion 44a which is adapted to be received in recess 45 in wedge member 40 and coact in clamping relation with a shoulder portion 46 on the main wedge member 40, for securing the main wedge member to the mounting member 16. Wedge block 40 has an opening 47 from the top thereof communicating with recess 45, and fastener 44 preferably has a socket 47a in the head portion thereof, adapted to receive a wrench or tool therein, through opening 47, to cause rotation of the bolt fastener 44. Rotation of threaded fastener 44 in one direction causes clamping of the wedge block 40 to mounting member 16. Rotation of fastener 44 in the opposite direction causes outward movement of the wedge block from pocket 24, due to the coaction between the fastener head and the defining surfaces of recess 45 in the wedge block 40.

The wedge block 40 comprises a side face 48 adapted for engagement with side surface 48a (FIGURE 10) of pocket 24 and an oppositely disposed wedge face 49, with face 48 having an elongated slot 50 formed therein commencing at the bottom surface 50a of the wedge block, and adapated to receive an associated pin or lug 51 projecting from defining side surface 48a of pocket 24. It will be seen that when the pin 51 is disposed in the slot 50, that the wedge block 40 is prevented from moving axially out of the pocket 24 and also longitudinally of the pocket, by such pin. The aforementioned threaded fastener 44, of course, retains the main wedge block in positive fastened condition in the pocket. However, loosening or rotation of fastener 44 with respect to the mounting member 16 causes raising or radial movement of the wedge block 40 with respect to the pocket 24. During such raising movement, the pin 51 continues to coact with slot 50 until the main block is raised substantially completely out of the pocket.

Block 40 also has a cutaway portion 52 (FIGURE 11) formed therein for receiving a complementary shoulder portion 53 on the auxiliary locking wedge 42. Auxiliary wedge block 42 has a wedge face 54 which is adapted for wedging coaction with the wedge face 49 on main wedge block 40, thus locking the auxiliary wedge block 42 against upward or radial movement relative to wedge block 40, while the aforementioned shoulder 53 locks auxiliary block 42 against axial movement with respect to the main wedge block 40. Shoulder portion 53 on auxiliary wedge 42 is preferably tapered in a vertical direction commencing at the bottom thereof, for wedging coaction with a complementary vertical taper on cutaway portion 52 on wedge block 40, to additionally prevent upward or radial movement of the auxiliary wedge with respect to the main wedge 40.

A lip 58 is provided on auxiliary wedge block 42, which lip projects outwardly therefrom and slopes upwardly and which is adapted for holding coaction with the aforementioned underlying beveled surface 38 on the cutting insert 32. The side face 60 on auxiliary wedge block 42 is adapted to snugly engage the inner face 62 on the adjacent cutting insert, and urge such insert into abutting relation against wall 66 of the pocket 24. It will be seen that with such an arrangement, if auxiliary wedge block 42 attempts to move radially outwardly relative to the cutting tool, the wedging relationship between faces 49 and 54 and between cutaway 52 and shoulder portion 53 on respectively the main wedge block and auxiliary block 42, prevents such movement and urges the auxiliary block 42 into even greater holding relationship with the cutting insert member 32, while the lip 58 on the auxiliary block 42 positively prevents radial outward movement of the cutting insert member from its position in the pocket. Moreover, the aforementioned pin 36 prevents outward axial movement of the cutting insert out of the pocket, and thus it will be seen that the cutting insert is positively locked in tightly-held, wedged relationship in the pocket 24 of the mounting member 16 in the clamped condition of clamping assembly 30.

However, in the event that it is desired to index the cutting insert so that a new fresh cutting edge can be exposed for cutting operations, then by turning fastener 44 so as to loosen the latter, the main wedge block 40 is raised outwardly, thereby freeing the auxiliary wedge block 42 and permitting outward movement of the auxiliary wedge block with respect to the pocket 24, and to a position where the cutting insert member 32 can be rotated or indexed to expose a new cutting edge (FIGURE 12). All of the latter may occur without removing the clamping assembly and/or the cutting insert from the holder member pocket 24. Spring 68 extending from the bottom surface of auxiliary wedge block 42 operates to automatically move the auxiliary wedge member 42 outwardly away from clamping position with respect to cutting insert 32, upon outward movement of the main wedge member 40 by fastener 44. It will be seen that the cutting insert can be indexed four times in the embodiment illustrated, to expose four cutting edges. Afterwards it can be removed from the assembly and reground or thrown away. In the loosened condition of the clamping assembly as shown in FIGURE 12, the insert can be readily indexed or removed from the pocket 24.

Referring now to FIGURES 13 and 14, there is illustrated a tool holder 70 for use, for instance, on a lathe comprising a pocket 71 on one edge thereof in which is disposed a cutter insert member 72 for cutting operations. A wedging member 74 having a wedging face 76 thereon adapted for wedging coaction with a complementary face 78 partially defining the pocket 71 is provided. Member 74 also has a lip 80 which is disposed in overlapping relationship with an oblique portion of the cutting insert 72, to positively hold the cutting insert against radial movement with respect to the tool holder 70. A locking lug 84, including a pivot portion 84a, is also provided coacting with the tool holder so that, upon tightening of the threaded fastener member 86, the leading end of the locking lug 84 is forced into clamping relationship with the cutting insert 72, to thus hold the insert in the pocket. The lip 80 on the wedge member 74 being in engagement with the cutting insert 72 prevents outward movement of the insert since any such movement of the cutting insert will cause engagement between the faces 78 and 76 on respectively the tool holder and the wedge member. The cutting insert member 72 may be of the reversible type so that when one cutting edge becomes dull, the insert can be indexed upon loosening of lug 84, to present a new sharp cutting edge.

Referring now to FIGURES 15 through 18, there is illustrated a rotary saw member 89 which may include a body portion 92 (FIGURE 16) to which are attached the mounting members or boxes 94 and as by means of threaded members 96, which as illustrated in FIGURE 16 may coact between two adjacent mounting members 94 to hold both members in anchored condition on the body portion 92 of the saw. A chip recess 100 may be provided in the mounting member similar to that for the FIGURE 1 through 10 embodiment, and the cutting insert member 102 is adapted to be held in assembled relationship with the respective mounting member by means of the clamping assembly 104.

Clamping assembly 104 may include a main wedge member 106 and an auxiliary wedge member 108, with the main wedge member being anchored or secured in the pocket 110 of the mounting member, by means of a threaded member 112. The main wedge block 106 has a wedging face 114 coacting in wedging relationship with face 116 on the auxiliary wedge block 108. Auxiliary block 108 has a lip 120 thereon overlapping the cutting insert 102 and thus preventing radial or outward movement of the insert with respect to the tool. Both the auxiliary wedge block and the main wedge block may have a tongue portion 122, 122a formed thereon with the tongue 122 on the auxiliary wedge block being received in a complementary groove in the main wedge block, while tongue 122a on the main block is received in a groove 126 formed in the defining pocket face of the mounting box. Such an arrangement provides lateral stability to the clamping assembly. In order to facilitate the formation of pocket 110 in the mounting member, a filler member 128 is provided with tongues 130, 130a thereon received in complementary grooves in the mounting member, and with a fastener 132 holding filler member 128 in position. As can be best seen in FIGURE 17, the pocket portion 110a defined by filler member 128 is formed obliquely in a transverse direction and the cutter insert 102 is likewise obliquely disposed with respect to the longitudinal vertical center plane of the saw. The pockets and associated cutting inserts of alternate teeth are sloped in opposite directions to provide a full width cut for the saw, and as diagrammatically illustrated in FIGURE 17.

The operation of the clamping assembly 104 is generally similar to that of the first described embodiment wherein any tendency of the insert to move radially outwardly is prevented by the overlapping engagement of the lip 120 on the auxiliary wedge block, which in turn is held in locked wedged condition by the main wedge block 106, thus urging cutting insert 102 into tightly held cutting position in pocket portion 110a. The cutting inserts 102 are preferable indexible so that when one cutting edge becomes dull through usage, another can be exposed for the cutting operation by reversing the insert.

FIGURE 18 illustrates a rotary saw design wherein breaker teeth 134 having a triangular-shaped head are alternated with cutting teeth 136, and which may be held on the body of the rotary saw by a clamping arrangement similar to that aforediscussed in connection with FIGURES 15 and 16. In this arrangement the teeth or cutting inserts project generally radially from the saw body, rather than obliquely as in the prior discussed embodiment.

From the aforegoing discussion and accompanying drawings it will be seen that the invention provides a novel rotary cutting tool having a novel clamping assembly for detachably mounting cutting inserts or teeth on the tool, and wherein the clamping assembly is effective to positively hold the teeth or inserts in predetermined cutting position and in a manner preventing movement of the teeth from the tool body, and wherein the clamping assembly can be readily deactivated for expeditious indexing or removal of the cutting teeth.

The terms and expressions which have been used are used as terms of description and not limitation, and there is no intention in the use of such terms and expressions of excluding any equivalents of any of the features shown or described, or portions thereof, and it is recognized that various modifications are possible within the scope of the invention claimed.

I claim:

1. In a cutting tool comprising a rotatable body portion, means on said body portion for mounting a cutting insert thereon for metal cutting operations, said means including a pocket, a cutting insert removably mounted in said pocket, and a clamping assembly securing said insert in said pocket, said clamping assembly including wedge means coacting with said insert to prevent movement of the insert in said pocket, and holding means coacting with the wedge means for holding the latter in predetermined position in said pocket, said holding means being readily deactuateable for deactivating said wedge means to permit rapid removal of the insert, said wedge means comprising a main wedge member having a wedging face thereon and an auxiliary wedge member having a wedging face thereon formed complementary to the wedging face on said main wedge member and adapted for wedging coaction therewith, and lip means on said auxiliary wedge member overlying said insert and coacting with the latter to retain said insert in said pocket.

2. A tool in accordance with claim 1 wherein said cutting insert has multi-cutting edges and is indexible to present a new sharp cutting edge in cutting position upon deactivation of said clamping assembly and predetermined rotation of the cutting insert.

3. A tool in occordance with claim 1 wherein said auxiliary wedge member has spring means coacting therewith for urging said auxiliary wedge member outwardly out of said pocket, and said holding means comprising fastening means coacting with said main wedge member for moving said main wedge member outwardly of said pocket.

4. A tool in accordance with claim 1 wherein said cutting insert member has a complementary tapered abutment surface thereon adapted for abutting relationship with said lip means on said auxiliary wedge member.

5. A tool in accurance with claim 1 wherein said auxiliary wedge member has a shoulder portion formed thereon disposed in coacting holding relationship with a cutout portion on said main wedge member for interlocking the auxiliary wedge member with said main wedge member.

6. A tool in accordance with claim 1 wherein said main wedge member has a slot formed therein on a face thereof disposed opposite said wedging face and coacting with a pin projecting from a defining surface of said pocket, for retaining said main wedge member in predetermined position in said pocket.

7. A tool in accordance wih claim 1 wherein said means for mounting said cutting insert comprises a block-like mounting member having said pocket formed therein, and means detachably securing said mounting member to said body portion, said mounting member having a chip recess therein disposed forwardly of said pocket.

8. A tool in accordance with claim 1 wherein said holding means includes a threaded fastener, said main wedge member including means coacting with said threaded fastener for holding said main wedge member in predetermined position in said pocket to thus lock said auxiliary wedge member in predetermined position and in coacting relation with said cutting insert, the last mentioned means on said main wedge member being adapted to coact with said fastener upon predetermined withdrawal rotation of said fastener to cause outward movement of said main wedge member out of said pocket.

9. A tool in accordance with claim 1 wherein said means for mounting said cutting insert comprises a mounting block disposed on the periphery of said rotary body portion and having means coacting therewith for attaching said block to said body portion, said pocket comprising a slot formed in said block with said cutting insert and said clamping assembly disposed in side-by-side relation in said pocket, a filler block coacting with said insert member and said clamping assembly filling a portion of said slot, and means securing said filler block to said mounting block.

10. A tool in accordance with claim 1 wherein said main wedge member and said auxiliary wedge member have tongue and groove means for interlocking the wedge members together against axial movement with respect to said rotary body.

11. A tool in accordance with claim 10 wherein said pocket extends generally radially in said rotary body portion and includes a section disposed obliquely with respect to a vertical plane passing through the rotary axis of said rotary body portion with said obliquely disposed section receiving therein the cutting insert.

References Cited

UNITED STATES PATENTS

| | | | |
|---|---|---|---|
| 2,037,642 | 4/1936 | Scribner | 29—105 |
| 2,287,187 | 6/1942 | Masse | 29—105 |
| 2,805,468 | 10/1957 | Williams | 29—105 |
| 3,023,486 | 3/1962 | Bogner | 29—105 |
| 3,214,825 | 11/1965 | Williams | 29—105 X |

HARRISON L. HINSON, Primary Examiner